H. PUFF.
VEHICLE BODY AND PORTABLE EXTENSION THEREFOR.
APPLICATION FILED JUNE 14, 1919.
1,344,717.
Patented June 29, 1920.
2 SHEETS—SHEET 1.
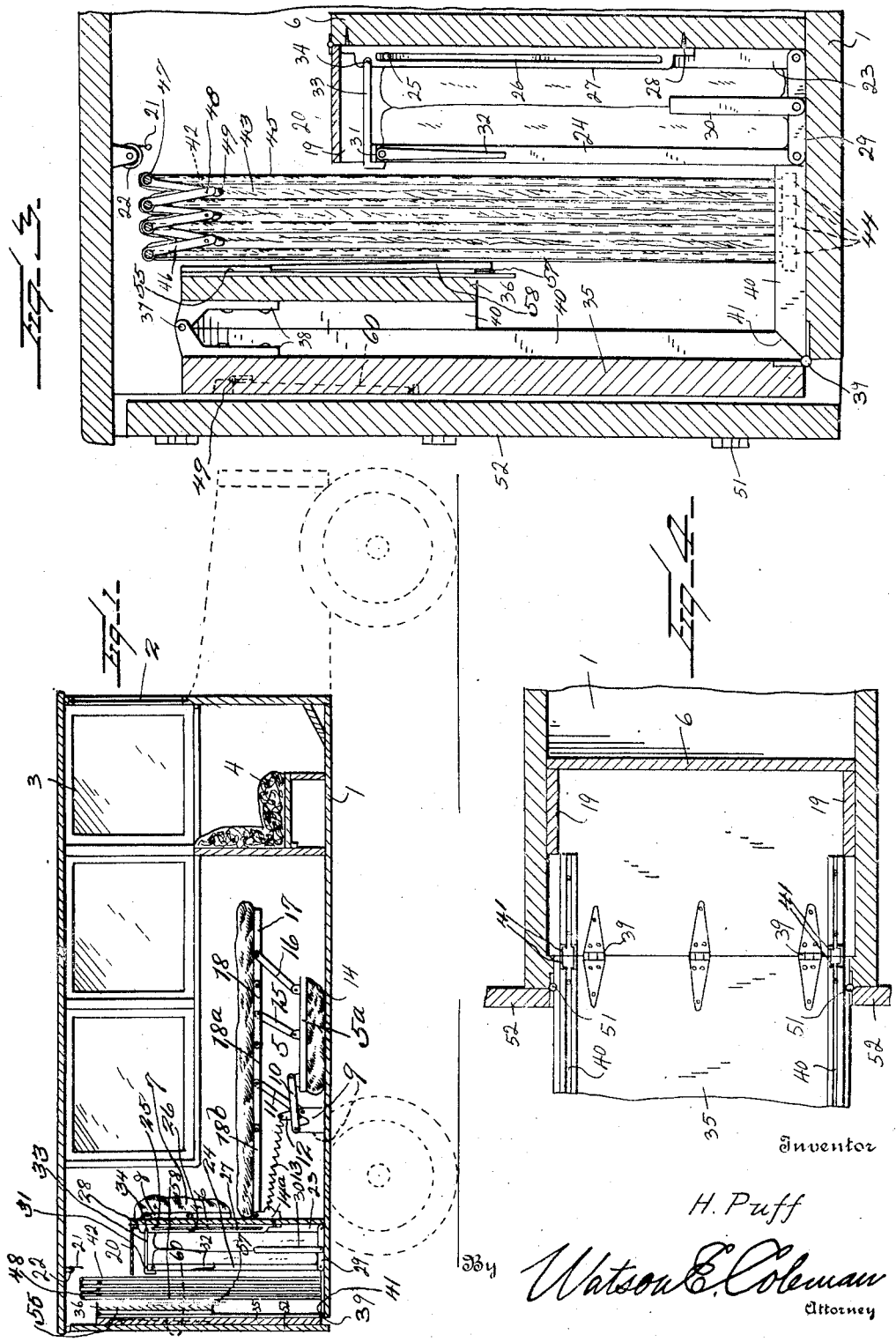
Inventor
H. Puff
By Watson E. Coleman
Attorney H. PUFF.
VEHICLE BODY AND PORTABLE EXTENSION THEREFOR.
APPLICATION FILED JUNE 14, 1919.
1,344,717.
Patented June 29, 1920.
2 SHEETS—SHEET 2.
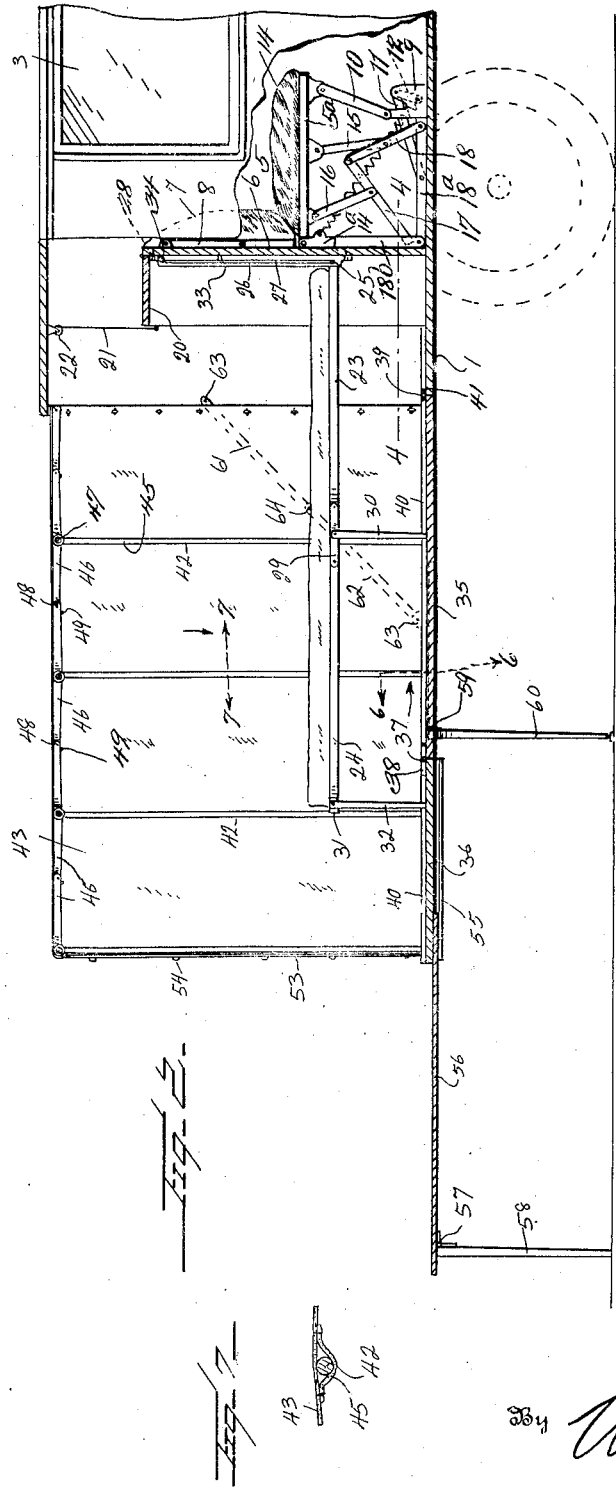
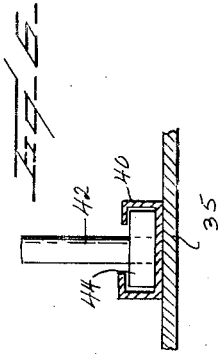
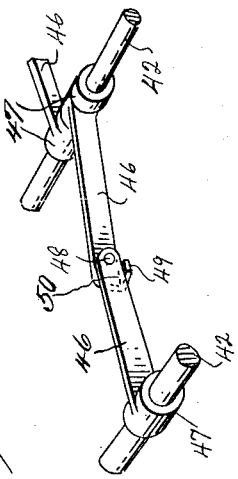
Inventor
H. Puff
By Watson E. Coleman
Attorney

UNITED STATES PATENT OFFICE.

HENRY PUFF, OF ST. CLOUD, MINNESOTA.

VEHICLE-BODY AND PORTABLE EXTENSION THEREFOR.

1,344,717.  Specification of Letters Patent.  Patented June 29, 1920.

Application filed June 14, 1919. Serial No. 304,211.

*To all whom it may concern:*

Be it known that I, HENRY PUFF, a citizen of the United States, residing at St. Cloud, in the county of Stearns and State of Minnesota, have invented certain new and useful improvements in Vehicle-Bodies and Foldable Extensions Therefor, of which the following is a specification, reference being had to the accompanying drawings.

This invention relates to an improved vehicle body and foldable extension therefor, particularly those used upon motor driven vehicles or automobiles.

Heretofore when traveling in touring automobiles, particularly any great distance, the occupants are required to put up at hotels along the route, thereby adding to the expense of the trip as well as being put to many disadvantages found in stopping at hotels.

Therefore, the present invention aims to provide a vehicle body having practically all the necessary living advantages, whereby the occupants of the automobile may not only have sleeping quarters over night, but also, by carrying their eatables, together with requisite camp stools, they may dine to suit their own convenience.

In order to accomplish this result, it is a further aim of the invention to provide an automobile or vehicle body having a foldable bed and a foldable extension for the body (which also may support a foldable bed), so that the occupants of the automobile may stop anywhere along the route, and put up for the night.

The invention further aims to provide an extensible table carried by the foldable extension, which table, when the foldable extension is extended, may be arranged in position, whereby a table cloth can be placed thereon.

The invention further aims to provide means carried by the dominant body of the automobile or vehicle, for receiving the foldable or collapsible extension, when collapsed, so that the rear end of the dominant body may be closed.

The invention further aims to provide a rear seat in the dominant body, having its back hollow, for the reception of the foldable bed, which is carried by the extension, when extended, so that the foldable bed may be arranged in a compact position, when the extension is closed or collapsed.

The invention further aims to provide the rear seat with a compartment under the seat proper, to receive a second foldable bed, which, when used, is carried by the floor of the dominant body.

The invention further aims to provide guiding means on the various bottom sections of the extension, in which the lower ends of the arms of the bows of the extension are guided, whereby the extension may be extended or collapsed.

A further object of the invention is the provision of means for holding and reinforcing the bows of the extension, when in an extensible position.

It will be noted that the rear seat of the dominant body practically divides the compartment of the dominant body, and the compartment of the extension, with the exception of a small space at the top. Therefore, a further object of the invention is to provide a curtain suspended from the top of the dominant body, to close the space, said curtain being mounted upon the usual spring roller. In this manner, the occupants of the automobile may have two compartments, each being practically private, one from the other, and particularly so when the curtains of the windows of the dominant body are drawn down.

The invention further aims to afford suitable closures for the rear of the dominant body, when the extension is collapsed. When the extension is in an extensible position, its rear portion may be closed by suitable curtains, that may be applied by the usual turn buttons.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a longitudinal sectional view through a vehicle or automobile body, showing the extension collapsed, and illustrating the foldable bed of the dominant body extended.

Fig. 2 is a longitudinal sectional view showing the extension in an extensible position, and illustrating the forward collapsible bed in collapsed position, and a rear bed in extended position.

Fig. 3 is an enlarged detail sectional view through the rear bed, showing it collapsed, and also showing the extension or auxiliary body collapsed.

Fig. 4 is a cross-sectional view on line 4—4 of Fig. 2, that is, through the auxiliary or extensible extension, in order to illustrate the guides for the lower ends of the side arms of the base of the extension.

Fig. 5 is an enlarged detail view of the top portion of the bows, showing the link connection between the bows, for bracing them.

Fig. 6 is a sectional view on line 6—6 of Fig. 2.

Fig. 7 is a sectional view on line 7—7 of Fig. 2.

Referring to the drawings, 1 designates the dominant body of the vehicle or automobile, preferaby of the limousine or touring type of car, which is provided with the front and side window lights 2 and 3, and which body may be supported upon the usual wheels, as shown in dotted lines in the drawings. The dominant body is provided with the usual front and rear seats 4 and 5 of the type shown.

However, the rear seat comprises a vertical partition 6, which rises upwardly from the floor of the dominant body. Links 8 are pivotally connected to the partition 6, and are in turn pivotally connected to the side edges of the back 7, so that the back may be held in suspended position adjacent the partition 6. The seat proper 14 consists of a frame 5ª, which supports the cushion, and pivotally connected to the frame 5ª are the links 15 and 16. Rising upwardly from the floor of the dominant body are the upright brackets 9, and pivotally connected to certain arms of said brackets are links 10, which are in turn connected to the frame 5ª of the seat proper. Angular levers 11 are also pivotally connected to certain arms of the brackets 9, and to the short arms 12 of said levers coil tension springs 13 are connected, which in turn are secured to the brackets 14ª of the partition 6. The bed spring frame comprises the links, 17, 18, 18ª and 18ᵇ, which are pivotally united as shown, and the latter links 18ᵇ are pivotally connected to the brackets 14ª. The longer arms of the angular levers 11 are pivotally connected to the links 18ª of the bed spring frame, while the links 15 and 16 are pivotally connected respectively to the links 18 and 17 of the bed spring frame. It will be noted that when the bed spring frame is in use the seat proper 14 rests upon the floor of the dominant body under the bed spring frame, and when the bed spring frame is dispensed with, it is folded under the seat proper 14, as shown in Fig. 2. A spring 13 acts to tension the various parts of the connections between the bed spring frame and the seat proper, when the parts are being extended or folded.

Arranged adjacent the sides of the dominant body, and adjacent the rear face of the partition 6 near its opposite ends are side pieces 19, between which the rear extensible bed is designed to be disposed when collapsed. The top of the partition has a hinge piece 20, which may be disposed vertically. However, as shown in Fig. 2, the piece 20 is disposed horizontally, so that together with the curtain 21 mounted upon a spring roller 22, and which may be lowered to a point adjacent one edge of the piece 20, the two compartments of the vehicle are completely partitioned, so as to render both of them private. However, when the hinge piece 20 is disposed vertically, it is also possible to lower the curtain, and even though the curtain is spaced from the hinge piece 20 when the curtain is lowered, the two compartments of the vehicle are partitioned substantially equally as well as when the hinge piece 20 is arranged on a horizontal plane.

The rear bed spring comprises the side links 23 and 24, the former having headed lateral pins 25 slidably engaging the slots 26 of the plates 27, which are secured by screws or the like 28 to the rear face of the seat partition 6. By means of these slotted plates 27, it will be noted that the rear bed spring, when collapsed, may be disposed at the rear of the partition. The links 23 and 24 are connected by the short links 29, which have pivoted legs 30, in order to support the center part of the bed spring. The rear ends of the links 24 are connected by means of the bar 31, and the rear end portions of the links 24 have pivoted thereto supporting legs 32, in order to support the rear ends of the bed spring, when it is extended. When the rear bed spring is collapsed, in a position adjacent the rear face of the partition, the hooks 33 which are pivoted at 34 to the plates 27 overlie and engage the transverse bar, which connects the rear ends of the links 24, thereby holding the rear bed spring in a collapsed position. The auxiliary body or extension comprises the floor sections 35 and 36, which are hingedly united as at 37 by means of the plates 38. These plates 38 are fixed by screws or the like to the upper faces of the floor sections 35 and 36. The floor section 35 is hingedly connected at 39 to the rear edge of the flooring or bottom of the dominant body of the automobile. Secured upon the floor sections near their opposite side edges are channel guides 40. These channel guides, where the section 35 is hingedly connected to the bottom of the floor of the dominant body, are provided with mitered joints as shown at 41, in order to permit the floor section 35 to fold as shown in the drawings.

Suitable arch or bow members 42 are provided, to support a suitable covering 43, whereby the extension of the dominant body may be provided with a cover. These bows or arches are of the construction shown, and the lower ends of their side portions have threaded thereon heads or nuts 44, which enter the channels of the guides, which are secured to the upper faces of the floor sections 35 and 36. The cover which may be canvas, leather, or a composition thereof, or any other suitable material, is fastened to the bows or arches in any suitable manner, preferably by means of overlying pieces or tapes or straps 45, which are stitched to the cover. In order to reinforce the bows or arches relatively to each other, particularly when extended or open, the upper parts of the bows are connected by means of the links 46. The sleeve ends 47 of the links pivotally receive the upper parts of the arches or bows, and it is to be noted that the links 46 are pivotally connected as at 48, and in such wise as to permit them to collapse downwardly, when the bows are collapsed. However, when the cover of the extension is extended and the bows separated, abutments 49 of certain of the links 46 are engaged by the end portions 50 of the other links 46, thereby holding the links extended or open, in order to brace and hold the bows rigidly in separated positions, thereby stretching the covering of the extension.

The rear side edges of the side of the dominant body of the automobile or vehicle have hinged thereto as at 51 doors 52, which, when the extensible or auxiliary body is collapsed may be closed. The covering of the extensible body or extension, near the rear portions of the sides thereof is provided with flaps 53, which may be connected by the usual turn buttons 54, either when the extension or extensible body is collapsed, or open. When these flaps 53 are fastened together, when the extensible body or extension is open, the compartment of said extensible body is completely closed. The floor section 36 is provided with oppositely arranged parallel guides 55, to receive the table section 56. This table section may be retracted or extended, as the case may be. The rear portion of the table section has hinged thereto as at 57 suitable supporting legs 58, to support the table section when it is extended. The floor section 35 has hingedly connected thereto as at 59 supporting legs 60, to support the floor sections of the extension body, when extended. Suitable reinforcing links 61 and 62 are respectively connected as at 63 to the dominant body and the floor section 35, to reinforce and support the floor section 35. The adjacent ends of the links 61 and 62 are pivotally united as at 64.

The invention having been set forth, what is claimed as new and useful is:

1. In a device as set forth, the combination with a dominant body, of an extensible body at the rear of the dominant body, said extensible body comprising a plurality of collapsible floor sections foldable upon themselves and within the rear end of the dominant body, said floor sections having a plurality of guides adapted to aline when the floor sections are extended, of an extensible cover having bows movably engaging the guides, when the floor sections are extended, and guides on the bottom of the dominant body in alinement with the first guides and adapted to receive the bows, when the cover is collapsed within the rear of the dominant body.

2. In a device as set forth, the combination with a dominant body, of an auxiliary extensible body, said extensible body comprising collapsible floor sections, channel guides mounted upon the upper surface of the floor sections and the floor of the dominant body and being alined and arranged in parallelism, a cover having a plurality of collapsible bows or arch members having means engaging in said channels, whereby the cover may be collapsed or extended, while the floor sections are extended.

3. In a device as set forth, the combination with a dominant body, of an auxiliary extensible body, said extensible body comprising collapsible floor sections, channel guides mounted upon the upper surface of the floor sections and the floor of the dominant body and being alined and arranged in parallelism, a cover having a plurality of collapsible bows or arch members having means engaging in said channels, whereby the cover may be collapsed or extended, while the floor sections are extended, the upper portions of the bows having collapsible toggle links, for reinforcing and holding the bows equally spaced, when the cover is extended, and links connecting the sides of the dominant body and the floor sections, to hold the floor sections supported.

4. In a device as set forth, the combination with a dominant body, of an extensible body at the rear of the dominant body, said extensible body comprising a plurality of collapsible floor sections foldable upon themselves and within the rear end of the dominant body, said floor sections having a plurality of guides adapted to aline when the floor sections are extended, an extensible cover having stiffening members at intervals and engaging said guides, when the floor sections are extended, and guides on the dominant body in alinement with the first guide and adapted to receive said stiffening members when the cover is collapsed within the rear of the dominant body.

5. In a device as set forth, the combination with a dominant body, of an auxiliary extensible body, said extensible body comprising collapsible floor sections, guides upon the upper surfaces of the floor sections and the floor of the dominant body and being alined and arranged in parallelism, a cover having a plurality of stiffening arches having their ends engaging said guides, whereby the cover may be collapsed or extended while the floor sections are extended, and collapsible connections between the upper parts of the arches.

In testimony whereof I hereunto affix my signature in the presence of two witnesses.

HENRY PUFF.

Witnesses:
 PETER BRICK,
 ELIZABETH GROSS.